(12) United States Patent
Iglesias

(10) Patent No.: US 6,402,145 B1
(45) Date of Patent: Jun. 11, 2002

(54) QUESTION AND ANSWER BOARD GAME

(76) Inventor: Bernardo A. Iglesias, 6901 SW. 110 Ave., Miami, FL (US) 33173

( * ) Notice: Subject to any disclaimer, the term of this patent is extended or adjusted under 35 U.S.C. 154(b) by 0 days.

(21) Appl. No.: 09/661,025

(22) Filed: Sep. 13, 2000

(51) Int. Cl.⁷ ................................................. A63F 3/06
(52) U.S. Cl. ...................................... 273/243; 273/269
(58) Field of Search ................................. 273/243, 269, 273/264, 271, 429, 430, 431

(56) References Cited

U.S. PATENT DOCUMENTS 3,945,643 A * 3/1976 Breslow
4,991,854 A * 2/1991 Weiss
5,246,373 A * 9/1993 Becker
5,458,338 A * 10/1995 Beardsley
5,545,088 A * 8/1996 Kravitz
5,743,740 A * 4/1998 Visser et al.

* cited by examiner

Primary Examiner—William M. Pierce

(57) ABSTRACT

A question and answer board game to be played by at least two players having a board, a frame congregating a plurality cells, a dice, a plurality of cards having written questions and instructions to the players and a plurality of tokens having different colors to identify the users and is designed to identify the current position of the player at one of the cells. A number of cells represents Web sites designed to provide instructions to the player. The rest of the cells represents Web sites designed to companies that advertise their service and products, a user has to respond correctly to a predetermined number of questions in order to possess the selected cell. The purpose of this game is to possess a higher number of cells or Web sites and cards with correct answers about the history and development of the Internet industry.

3 Claims, 1 Drawing Sheet

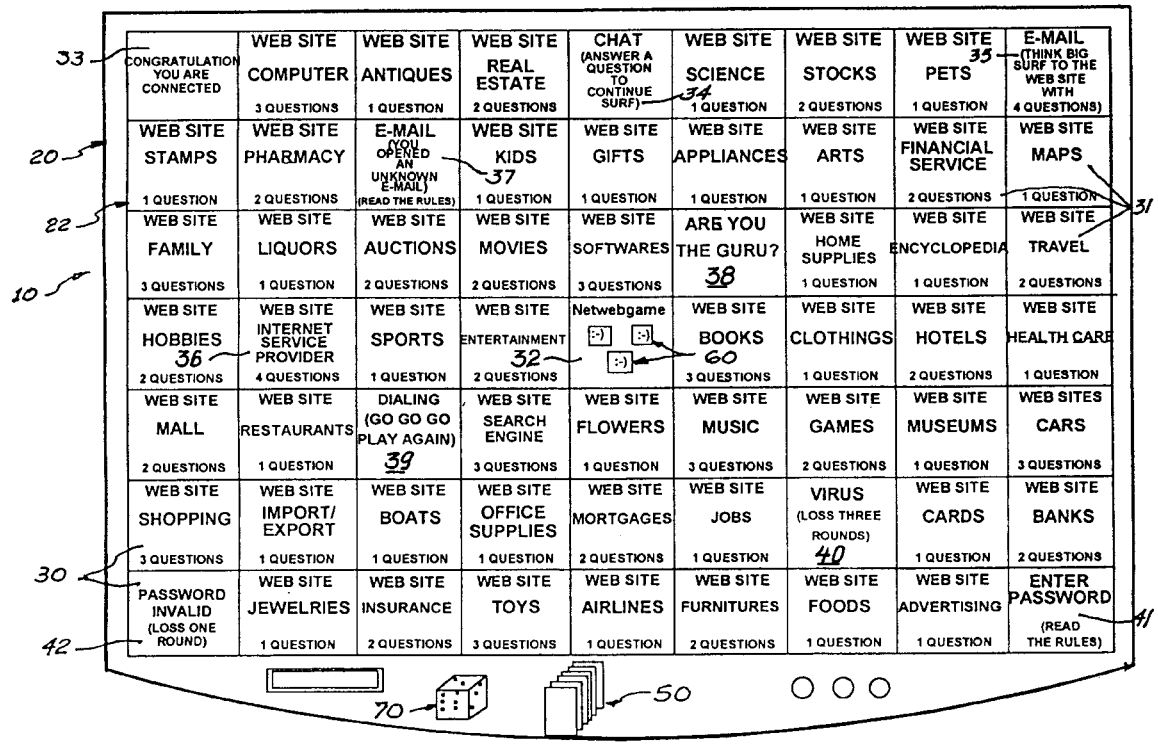

Fig 1

| CONGRATULATION YOU ARE CONNECTED | WEB SITE COMPUTER 3 QUESTIONS | WEB SITE ANTIQUES 1 QUESTION | WEB SITE REAL ESTATE 2 QUESTIONS | CHAT (ANSWER A QUESTION TO CONTINUE SURF) | WEB SITE SCIENCE 34 1 QUESTION | WEB SITE STOCKS 2 QUESTIONS | WEB SITE PETS 35 1 QUESTION | E-MAIL (THINK BIG SURF TO THE WEB SITE WITH 4 QUESTIONS) |
|---|---|---|---|---|---|---|---|---|
| WEB SITE STAMPS | WEB SITE PHARMACY 2 QUESTIONS | E-MAIL OPENED AN UNKNOWN E-MAIL (READ THE RULES) | WEB SITE KIDS 37 1 QUESTION | WEB SITE GIFTS 1 QUESTION | WEB SITE APPLIANCES 1 QUESTION | WEB SITE ARTS 1 QUESTION | WEB SITE FINANCIAL SERVICE 2 QUESTIONS | WEB SITE MAPS |
| 1 QUESTION | WEB SITE LIQUORS 1 QUESTION | WEB SITE AUCTIONS 2 QUESTIONS | WEB SITE MOVIES 2 QUESTIONS | WEB SITE SOFTWARES 3 QUESTIONS | ARE YOU THE GURU? 38 | WEB SITE HOME SUPPLIES 1 QUESTION | ENCYCLOPEDIA 1 QUESTION | WEB SITE TRAVEL 2 QUESTIONS |
| WEB SITE FAMILY 3 QUESTIONS | WEB SITE INTERNET SERVICE PROVIDER 4 QUESTIONS | WEB SITE SPORTS 1 QUESTION | ENTERTAINMENT 32 2 QUESTIONS | Netwebgame | WEB SITE BOOKS 60 3 QUESTIONS | WEB SITE CLOTHINGS 1 QUESTION | WEB SITE HOTELS 2 QUESTIONS | WEB SITE HEALTH CARE 1 QUESTION |
| WEB SITE HOBBIES 36 2 QUESTIONS | WEB SITE RESTAURANTS 1 QUESTION | DIALING (GO GO GO PLAY AGAIN) 39 | WEB SITE SEARCH ENGINE 3 QUESTIONS | WEB SITE FLOWERS 1 QUESTION | WEB SITE MUSIC 3 QUESTIONS | WEB SITE GAMES 2 QUESTIONS | WEB SITE MUSEUMS 1 QUESTION | WEB SITES CARS 3 QUESTIONS |
| WEB SITE MALL 2 QUESTIONS | WEB SITE IMPORT/ EXPORT 1 QUESTION | WEB SITE BOATS 1 QUESTION | WEB SITE OFFICE SUPPLIES 1 QUESTION | WEB SITE MORTGAGES 2 QUESTIONS | WEB SITE JOBS 1 QUESTION | VIRUS (LOSS THREE ROUNDS) 40 | WEB SITE CARDS 1 QUESTION | WEB SITE BANKS |
| WEB SITE SHOPPING 3 QUESTIONS | WEB SITE JEWELRIES 1 QUESTION | WEB SITE INSURANCE 2 QUESTIONS | WEB SITE TOYS 3 QUESTIONS | WEB SITE AIRLINES 1 QUESTION | WEB SITE FURNITURES 2 QUESTIONS | WEB SITE FOODS 1 QUESTION | WEB SITE ADVERTISING 1 QUESTION | 2 QUESTIONS |
| PASSWORD INVALID (LOSS ONE ROUND) | | | | | | | | ENTER PASSWORD (READ THE RULES) |

QUESTION AND ANSWER BOARD GAME

BACKGROUND OF THE INVENTION

1. Field of the Invention

The present invention relates to a board game, and more particularly, to the type that is based in answering questions about the Internet while a user obtains a space in the board.

2. Description of the Related Art

Many question and answer board games exist nowadays, however none of them disclose the features of the present invention. This invention discloses a board comprising a number of cells or web sites that a user obtains by journeying in any direction. Other board games establish a predetermined route for a user to go while complying with the rules of the game.

Another difference of this invention is that the questions formulated to the user, as a requisite to obtain a cell or space in the board, are based in the history and development of the Internet industry.

SUMMARY OF THE INVENTION

It is one of the main objects of the present invention to provide a board game that is didactic as a user is required to answer to a predetermined number of questions.

It is another object of this invention to provide a board game that includes questions of the history and general knowledge of the Internet.

It is still another object of this invention to provide a board game that feeds a user with the encouragement to take possession of a cell or web site by demonstrating his/her knowledge and not by using symbolic money.

It is still another object of this invention to provide a board game that is volumetrically efficient to store and transport.

It is yet another object of this invention to provide such a device that is inexpensive to manufacture and maintain while retaining its effectiveness.

Further objects of this invention will be brought out in the following part of the specifications, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is a schematic view of this invention.

DETAILED DESCRIPTION OF THE PREFERRED EMBODIMENT

Referring now to the drawing, it will be seen that the present invention referred to with numeral 10 basically includes board 20 with cells 30, cards 50, tokens 60 and six-facets dice 70.

Board 20, in the preferred embodiment, has a computer monitor configuration. Board 20 has frame 22 that defines the space of the game. Frame 22 groups 63 identical cells or Web sites 30. Tokens 60 are designed to identify the current position of the player in the game.

Cells or Web sites 30, in the preferred embodiment, have different names and characteristics in the game. In the drawing, cells or Web sites 31 represent 53 different Web companies or goods, such as "BOOKS", "BOATS", "ARTS", etc. Cells or Web sites 31 will represent the actual names of the most popular Web sites visited by the Internet users, so that a game player will be interested in possessing the biggest quantity of Web sites in comparison with his/her co-player as a symbol of the intellectual and economic power. Web sites 31 indicate a number of questions (1 questions; 2 questions or 3 questions) a player has to answer to be able to posses the selected Web site. Only Web sites 31 can be possessed by the players. Once the player responds correctly to the question that indicates the selected card 50, he/she keeps this card as a count at the end of the game to decide who will be the winner. Cards 50, in the preferred embodiment, include questions related to the Internet industry. Cards 50 also include a few numbers of what is called "E-MAIL" that provide a player with positive or negative instructions. These are not questions. The player has to obey to what is ordered in card 50 in order to continue playing.

Cell 32 is called "NETWEBGAME" and is the start spot or line of the game and is located in the center of board 20. The players are represented by their colored tokens 60 that are placed in cell 32 as the initial step. The next time a player stops at this cell, she/he has the right to go to any cell or Web site 31 and respond to the number of questions indicated in the selected cell. If the player does not respond correctly to all of the questions, then the selected cell remains free for the next player to intent to possess it.

Cell 33 is called "CONGRATULATION, YOU ARE CONNECTED". The first time a player stops at cell 33, can go to any Web site 31 with 1 question that he/she selects without the need of responding to any question. This first time is considered a gift to the player and the selected Web site 31 counts at the end of the game. The next time the player stops at cell 33, he/she must wait for the next round.

Cell 34 is called "CHAT" and the player has to answer one question to be able to continue playing. If the answer is not correct, then the player must wait for the next round until her/his next turn. This will be repeated until the player responds correctly to the question formulated in a new card 50.

Cell 35 is called "E-MAIL" "THINK BIG". Once a player stops at this cell, she/he will go to cell or Web site 36 that is called "INTERNET SERVICE PROVIDER". The player has to answer four questions to be able to possess Web site 36. If Web site 36 was already possessed by another player, then the current player will receive a penalty from the Web site's owner.

Cell 37 is called "E-MAIL" "you opened and unknown E-mail". The player has to return one card 50. If any card has been won, then the player losses a round while the other players continue throwing dice 70. Dice 70 has six facets wherein numbers from one to six are shown.

Cell 38 is called "ARE YOU THE GURU?". This cell instructs the player to go to a free Web site with 3 questions and respond to three questions formulated in cards 50 to be able to possess cell 38. If all Web sites 31 with 3 questions are possessed, then go to any free Web site 31 with 2 questions. If all Web sites 31 with 2 questions are possessed, then go to a Web site 31 with 1 question.

Cell 39 is called "DIALING" "GO GO GO PLAY AGAN". This cell instructs the player to throw dice 70 again to continue playing.

Cell 40 is called "VIRUS". When the player stops at this cell, he/she losses three rounds.

Cell 41 is called "ENTER PASSWORD". The player is instructed to obtain any of the three Web sites 31 surrounding cell 41, such as, "BANKS", "CARDS" or "ADVERTISING". The player is required to answer the questions indicated to possess the selected Web site. If the above mentioned Web sites are already possessed, then the player will select one of the three Web sites 31 surrounding cell 41 and the Web site's owner will indicate the type of penalty the player will receive. The penalties, in the preferred embodiment, are loss a round or two, answer correctly to a question or continue attempting to respond until the answer is correct, go to cell 41, do a massage to a co-player or dance, etc.

Cell 42 is called "PASSWORD INVALID" and the player losses a round.

During the progress of this game, a player also receives a penalty when she/he stops at a cell or Web site already possessed by another player.

All the players place their colored tokens 60 in cell 32 and throw dice 70 on game board 20. The higher number indicated in the upper side of dice 70 will be the first player. Once the order of the players is established, the game starts. A player throws dice 70 and the number that is indicated is the number of cells or Web sites this player has to travel. The direction is determined by the player himself and can be horizontal, vertical and diagonal. If the player reaches the boarder of frame 22, a change of direction is allowed. Once the player stops at a selected cell or Web site, she/he has to follow the rules of the game, as is above described.

The player who answers correctly the first 20 questions, thus obtains the first 20 cards 50, will receive a prize. This prize consists of possessing one free Web site 31 with 2 questions with no need of answering any questions.

A player will identify his/her possessed Web site 31 with an element (not shown in the drawing) having the same color as the selected token 60. Also, the player can keep a record of his/her Web sites 31 in a notebook or the like.

The end of this game is established by the players themselves and can be a predetermined period of time or all Web sites 31 were possessed by them. The winner is the player with the higher score. This score is determined by adding the number of obtained Web sites 31, which count two points each, and the number of correct answers or cards 50, which count one point each. If the total scores for two or more players are equal, then the tied players go to another round and have to respond five questions each. The player with most correct answers will be the absolute wiener. The goal of this game is to possess a higher number of Web sites 31 and cards 50.

The foregoing description conveys the best understanding of the objectives and advantages of the present invention. Different embodiments may be made of the inventive concept of this invention. It is to be understood that all matter disclosed herein is to be interpreted merely as illustrative, and not in limiting sense.

What is claimed is:

1. A question and answer board game to be played by at least two players, comprising:

a board;

a plurality of cards having each one written question;

a plurality of cells congregated within a frame and wherein each cell of said plurality of cells is individually named and identical in dimensions, and said plurality of cells is divided in first and second plurality of cells, wherein each of said first plurality of cells indicates a predetermined number of questions to be answered by the user in order to possess the selected cell of said first plurality of cells and those predetermined number of cards of said plurality of cards that are correctly answered are kept in possession of the player, and wherein said second plurality of cells are designed to provide instructions to the user;

a dice having six facets wherein numbers from one to six are shown; and a plurality of tokens having different colors to identify the user and is designed to identify the current position of the player at one of said plurality of cells.

2. The question and answer board game set forth in claim 1 wherein the winner of the game is the user with a higher score that is determined by adding the number of possessed cells of said first plurality of cells and the number of obtained cards of said plurality of cards.

3. The question and answer board game set forth in claim 2 wherein the questions in said plurality of cards are related to the history and development of the Internet industry.

\* \* \* \* \*